(12) United States Patent
Kubo

(10) Patent No.: US 6,961,091 B1
(45) Date of Patent: Nov. 1, 2005

(54) DIGITAL CAMERA WITH LIGHT ADJUSTING CONTROL OF FLASH

(75) Inventor: Hiroaki Kubo, Muko (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/523,367

(22) Filed: Mar. 10, 2000

(30) Foreign Application Priority Data

Mar. 23, 1999 (JP) .......................... 11-078218

(51) Int. Cl.⁷ .................. H04N 5/222; H04N 5/238
(52) U.S. Cl. ............................ 348/370; 348/364
(58) Field of Search .................. 348/370, 371, 348/362, 364, 221.1, 224.1; 396/61

(56) References Cited

U.S. PATENT DOCUMENTS

| | | | | | |
|---|---|---|---|---|---|
| 5,438,367 | A | * | 8/1995 | Yamamoto et al. | 348/371 |
| 5,563,658 | A | * | 10/1996 | Parulski et al. | 348/350 |
| 5,585,942 | A | | 12/1996 | Kondo | |
| 5,752,101 | A | | 5/1998 | Akamatsu et al. | |
| 5,808,681 | A | * | 9/1998 | Kitajima | 348/371 |
| 5,861,620 | A | | 1/1999 | Takahashi et al. | |
| 6,035,135 | A | * | 3/2000 | Okamura | 396/61 |
| 6,069,659 | A | * | 5/2000 | Nakajima | 348/371 |
| 6,151,073 | A | * | 11/2000 | Steinberg et al. | 348/371 |
| 6,278,490 | B1 | * | 8/2001 | Fukuda et al. | 348/362 |
| 6,441,856 | B1 | * | 8/2002 | Sugimoto | 348/371 |
| 2001/0033333 | A1 | * | 10/2001 | Suzuki et al. | 348/220 |
| 2003/0206235 | A1 | * | 11/2003 | Suzuki | 348/304 |

FOREIGN PATENT DOCUMENTS

| | | |
|---|---|---|
| JP | 4-352936 A | 12/1992 |
| JP | 5-007332 A | 1/1993 |
| JP | 6-205288 A | 7/1994 |
| JP | 9-270951 A | 10/1997 |
| JP | 1-320872 | 12/1998 |
| JP | 1-320876 | 12/1998 |
| JP | 2000-078484 | 3/2000 |

* cited by examiner

*Primary Examiner*—Aung Moe
(74) *Attorney, Agent, or Firm*—Sidley Austin Brown & Wood LLP

(57) ABSTRACT

A digital camera capable of photography using a flash exposure to illuminate a photographic subject is provided with an image sensor having a plurality of photoreceptor elements and capable of independently reading the electrical load of a specific photoreceptor element among the plurality of photoreceptor elements, and a detector for detecting the amount of load accumulation due to light exposure of a specific photoreceptor element when using a flash exposure. A controller stops the flash emission when the detection result of the detector reaches a predetermined level. In this way, light adjusting control is accomplished in real time.

20 Claims, 8 Drawing Sheets

| G | R | G | R | G |
|---|---|---|---|---|
| B | G | B | G | B |
| G | R | G | R | G |
| B | G | B | G | B |
| G | R | G | R | G |

Layout pattern of pixels
of the image sensor (B)

| 1/4 | 0 | 1/4 |
|---|---|---|
| 0 | 0 | 0 |
| 1/4 | 0 | 1/4 |

Pm

Interpolation filter
when a G pixel is used (C)

| | 0 | 1/4 | 0 | |
|---|---|---|---|---|
| 0 | 0 | 0 | 0 | 0 |
| 1/4 | 0 | 0 | 0 | 1/4 |
| 0 | 0 | 0 | 0 | 0 |
| | 0 | 1/4 | 0 | |

Pm

Interpolation filter
when a R or B pixel is used

DIGITAL CAMERA WITH LIGHT ADJUSTING CONTROL OF FLASH

CROSS-REFERENCE TO RELATED APPLICATIONS

This application is based on Patent Application No. 11-78218 filed in Japan, the content of which is hereby incorporated by reference.

FIELD OF THE INVENTION

The present invention relates to a digital camera, and specifically relates to the art of light adjusting control of flash used in a digital camera.

BACKGROUND OF THE INVENTION

Digital cameras using an image sensor generally are capable of exposure control using image data read by the image sensor. However, because the image data are read after the flash exposure during flash photography, light adjusting control cannot be performed during the flash emission using the read image data.

Conventionally, the following light adjusting control methods are often used. One light adjusting control method is an external light adjusting control method wherein flash exposure light reflected from a photographic subject is received by an external light adjusting control element without passing through a photographic lens, so as to control the flash exposure based on the output signals from this external light adjusting control element. Another light adjusting control method performs a preliminary flash exposure prior to a main flash exposure, and controls the main flash exposure based on the image data from an image sensing element during the preliminary flash exposure.

In the case of the former light adjusting control method, since the light reflected from the photographic subject does not pass through the photographic lens, a shift may be generated in the light adjusting control range relative to changes in the field angle accompanying dislocation of the lens position as when a zoom lens is used as the taking lens. This shift in the light adjusting control range may be directly and disadvantageously linked to a shift in the light adjusting control precision. In the case of the latter light adjusting control method, there is no concern of a shift in the light adjusting control range caused by change in field angle because the flash exposure light reflected by the photographic subject passes through the taking lens. However, a time lag may be disadvantageously generated in the light adjusting control because a flash exposure must be performed twice, once in the preliminary flash exposure and once in the main flash exposure.

Another well-known light adjusting control method separate from the above mentioned methods controls luminance and is a method wherein light reflected from a photographic subject and passing through a photographic lens is reflected by the photoreceptor surface of the image sensor, and this reflected light is received by a separately provided photoreceptor element which measures the amount of reflected light received to accomplish light adjusting control. In this instance, however, the degree of precise flatness of the photoreceptor surface of the image sensor is readily affected by the material forming the photoreceptor surface, e.g., metal, protective glass and the like, such that light adjusting control data does not have a high reliability.

An object of the present invention is to eliminate the previously described disadvantages by providing a digital camera capable of highly reliable light adjusting control in real time without fear of dislocation of the light adjusting control range due to change of field angle during flash photography.

SUMMARY OF THE INVENTION

These objects are attained by a digital camera having the construction described below. A digital camera capable of flash photography by illuminating a photographic object, the digital camera comprising: an image sensor for sensing an image of the photographic object, the image sensor including a plurality of photoreceptor elements, the image sensor being adapted for reading an electrical load accumulation of each of the at least one predetermined photoreceptor element among the plurality of photoreceptor elements; a detector for detecting an amount of the electrical load accumulation of each of the at least one predetermined photoreceptor element due to light exposure on the at least one predetermined photoreceptor element when using a flash exposure for a duration of the flash exposure, and for outputting a corresponding detection signal; and a controller for accomplishing light adjusting control of the flash exposure based on the thus outputted detection signal.

In this digital camera, the controller accomplishes a flash emission until the amount of load accumulation in a specific photoreceptor element detected by the detector attains a predetermined level. Then, when the amount of load accumulation attains a predetermined level, the controller stops the flash emission. In this way, since luminance is controlled using the amount of load accumulation of a specific photoreceptor element of the image sensor, there is no dislocation of the light adjusting control range due to a change of field angle as in the external light adjusting control method. Since the amount of load accumulation during an on-going flash photograph is used, light adjusting control is accomplished in real time. Furthermore, highly reliable control is achieved because this method does not use the light reflected by the photoreceptor surface of the image sensor.

An example of a sensor usable as the image sensor is a CMOS sensor. If a CMOS sensor is used, reliable detection of the amount of load accumulation in a specific photoreceptor element can be obtained by the detector.

Furthermore, this specific photoreceptor element can be reset independently to start a new load accumulation operation from an initial state. The detector also may be constructed to detect the amount of load accumulation by repeatedly resetting the specific photoreceptor element during load accumulation, reading the load prior to each resetting, and performing cumulative addition of the accumulated loads obtained by each reading.

When a load continuously accumulates in a specific photoreceptor element, the load accumulation level of the photoreceptor element may approach saturation level before the accumulation amount attains a predetermined level, causing concern that an accurate load accumulation amount may not be obtained. Conversely, when a new accumulation operation is performed from an initial state, the operation of reading the load accumulated by this accumulation operation can be repeated, and the data obtained by the respective reading operations may be cumulatively added. In this way, if normally using an operating range (i.e., the range up to a saturation level) appropriate for the operating characteristics of the specific photoreceptor element, accurate load accumulation can be obtained for more precise light adjusting control.

BRIEF DESCRIPTION OF THE DRAWINGS

In the following description, like parts are designated by like reference numbers throughout the several drawings.

FIGS. 6(A)–6(C) illustrate the interpolation process relating to the photoreceptor element used for light adjusting control in the image sensor of FIG. 1;

DETAILED DESCRIPTION OF THE PREFERRED EMBODIMENTS

The embodiments of the present invention are described hereinafter with reference to the accompanying drawings.

Figure 1:
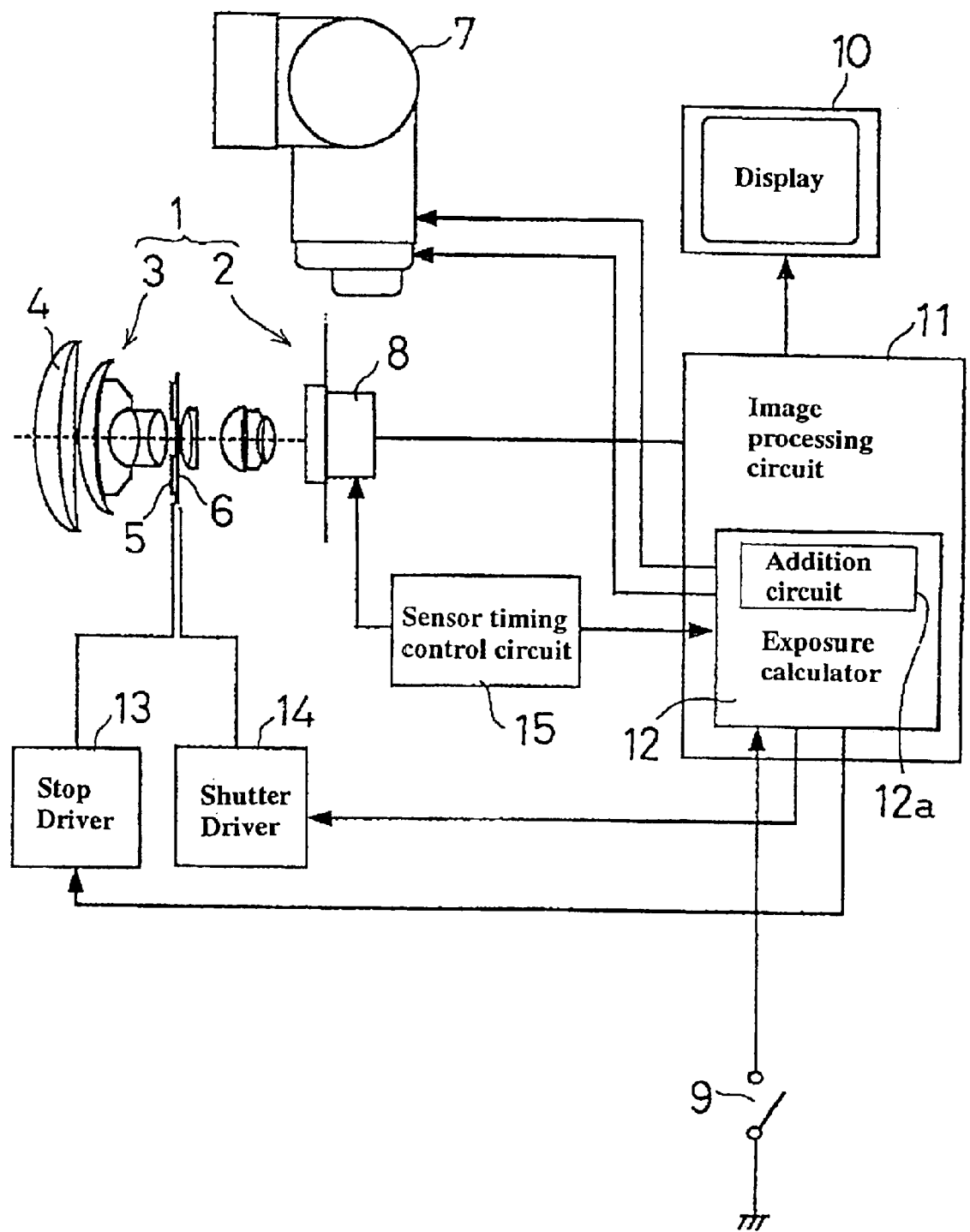
FIG. 1 is a block diagram showing the electrical structure of an embodiment of the digital camera of the present invention.

FIG. 1 is a block diagram showing the electrical structure of an embodiment of the digital camera of the present invention.

In FIG. 1, a digital camera 1 comprises a camera body 2 provided with various circuits described later, and a taking lens unit 3 installed on the front surface of the camera body 2.

The taking lens unit 3 is provided with a taking lens 4 for capturing an optical image of a photographic object, a stop 5 for restricting the amount of light, a mechanical shutter 6 and the like.

The camera body 2 may be constructed using the body of a camera originally designed for silver halide film use or the like. An image sensor 8 is provided at a position corresponding to the position occupied by a silver halide film in the camera body 2, and is arranged with the photoreceptor surface facing toward the taking lens 4 side. The image sensor 8 photoelectrically converts the light of the formed object image on the optical path of the taking lens 4. The image sensor 8 may be, for example, an area sensor which reads all pixels having a color mosaic filter or the like; in the present embodiment a CMOS sensor is used which is provided with photoreceptor elements comprising a plurality of CMOS type photodiodes.

A detachable high-speed intermittent flash unit 7 is installed on the camera body 2. A shutter button 9 is provided on the camera body 2, and a display unit 10 is installed on the camera body 2. The display unit 10 comprises a liquid crystal display (LCD), and displays photographic images and live view images when previewing.

The camera body 2 is provided with, in addition to the image sensor 8, an image processing circuit 11, exposure calculator 12, stop driver 13, shutter driver 14, and sensor timing control circuit 15. The camera body 2 is further provided with, although not shown in the illustration, an image memory for temporary storage of image data, and a removable memory card or the like for storing photographic images.

The image processing circuit 11 converts analog image signals output from the image sensor 8 to digital image signals, and thereafter these digital signals are subjected to image processing such as pixel interpolation, white balance, gamma correction and the like. The image processing circuit 11 displays preview images and photographic images on the display unit 10. The processed image signals are subjected to matrix conversion to luminance signals within the image processing circuit 11, and input to the exposure calculator 12.

The exposure calculator 12 generates exposure control signals in accordance with the luminance by comparing the luminance signals to reference signals. The exposure control value of the exposure control signal is substituted in the load accumulation time and stop parameters based on a pre-established table. The exposure calculator 12 is provided with an addition circuit 12a for cumulative addition of each load accumulation amount obtained by repeated load accumulation by the light adjusting control photoreceptor element during flash photography. When the load accumulation obtained by the addition circuit 12a attains a predetermined level, the exposure calculator 12 stops the emission by the flash unit 7. That is, the addition circuit 12a functions as a detection means for detecting the amount of load accumulation by the light adjusting control photoreceptor element.

The sensor timing control circuit 15 controls the load accumulation time and reading timing of the image sensor 8 in accordance with commands from the exposure calculator 12. The load accumulation start timing of the image sensor 8 is controlled based on the signals from the sensor timing control circuit 15. The shutter driver 14 controls the opening and closing of the mechanical shutter 6 based on instructions from the exposure calculator 12. The load accumulation stop timing of the image sensor 8 is set by the timing for closing the mechanical shutter 6.

The stop driver 13 controls the aperture diameter of the stop 5 in accordance with a predetermined stop amount set by the exposure calculator 12.

After the stop amount has been set by the stop driver 13, when the photoreceptor element of the image sensor 8 is reset after the mechanical shutter 6 opens, load accumulation starts. When a predetermined load accumulation time elapses, the mechanical shutter 6 is closed, the image sensor 8 is entirely shielded from light, and in this state, the signals of each photoreceptor element are read.

Figure 2:
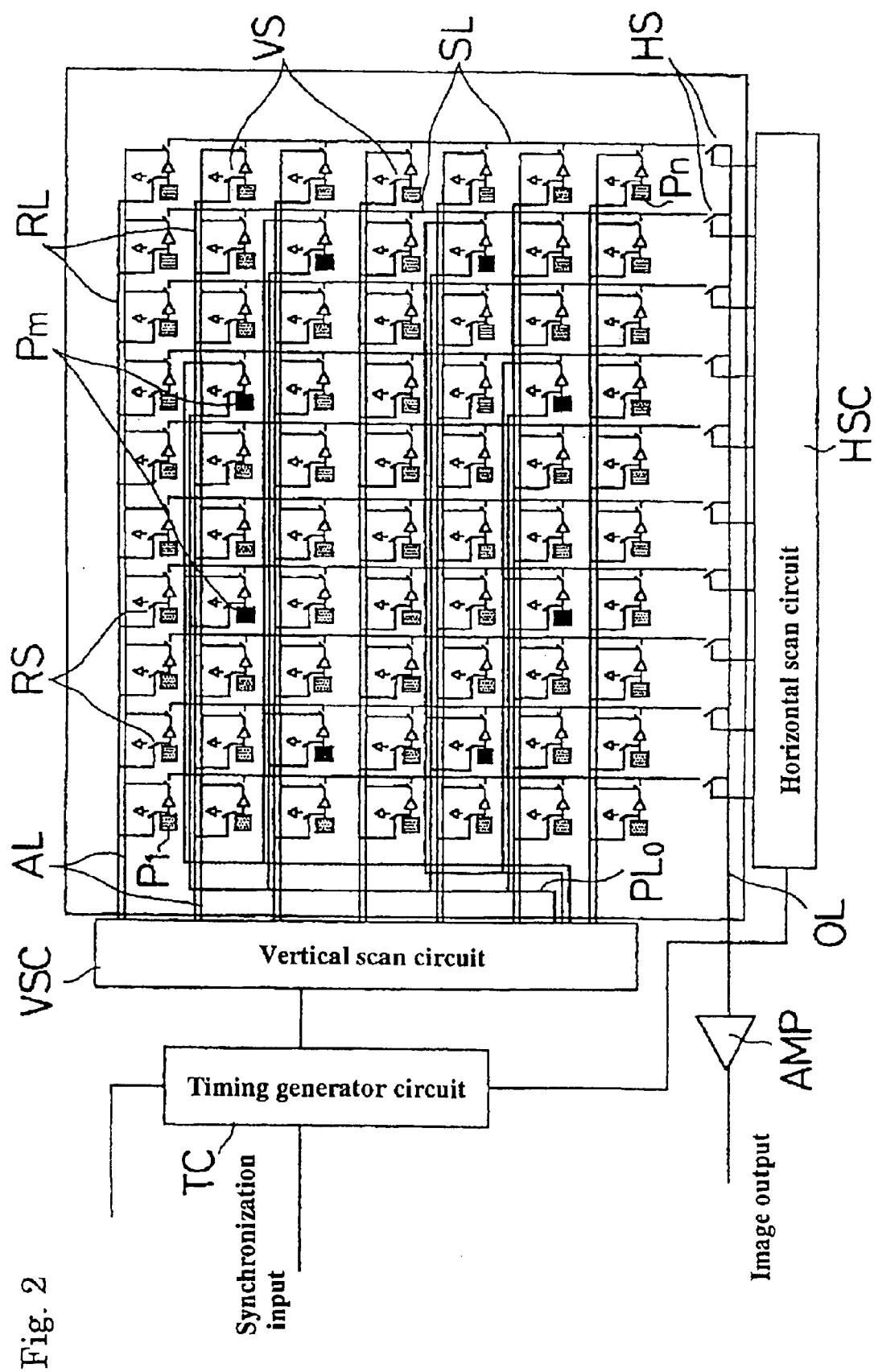
FIG. 2 is a structural view showing the drive unit of an image sensor used in an embodiment of the digital camera of the present invention.
Figure 3:
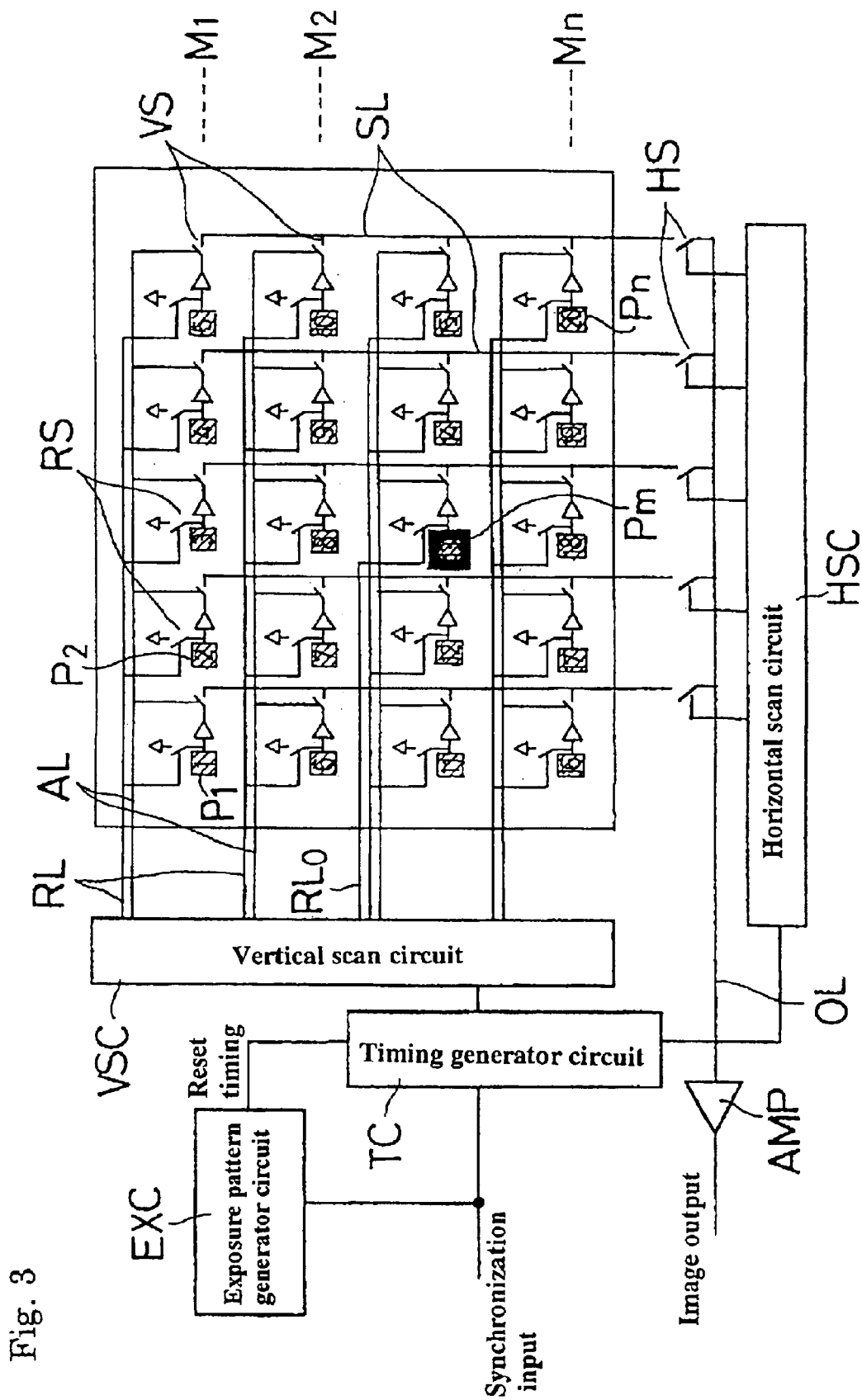
FIG. 3 is an enlarged view of the drive unit of FIG. 2.

The image sensor 8 includes pixels of photoreceptor elements P1–Pn comprising a plurality of CMOS photodiodes arrayed in a matrix, as shown in FIGS. 2 and 3. Each photoreceptor element P1–Pn converts the formed optical image via photoelectric conversion and accumulates an electrical load corresponding to the amount of light exposure. As shown in FIG. 2, a portion of all photoreceptor elements P1–Pn, e.g., a plurality of individual photoreceptor elements Pm, are provided as light adjusting control photoreceptor elements for the flash unit 7.

FIG. 3 shows the drive unit of the image sensor 8. In FIG. 3, the photoreceptor elements of each third horizontal and vertical row are set as the previously mentioned light adjusting control photoreceptor element Pm.

Reset switches RS are connected to each photoreceptor element P1–Pn to discharge (to zero) the accumulated load of the photoreceptor element. Reset lines RL are connected to each horizontal row groups M1–Mn of reset switches RS. The reset line RL transmits a reset signal from the vertical scan circuit VSC to the reset switch RS. The reset switches RS of a horizontal row group are closed at the time a reset signal is received by the horizontal row group. After an accumulated load has been discharged during the prior photoelectric conversion, the reset switch RS is immediately opened, and each photoreceptor element P1–Pn returns to an activation state (a state wherein a load can accumulate via light exposure).

A special reset line RLo is connected to the light adjusting control photoreceptor ent Pm. The light adjusting control photoreceptor element Pm is reset by reset line RLo, which is independent of reset line RL.

Vertical readout switches VS are respectively connected to the photoreceptor elements P1–Pn. A plurality of address lines AL are respectively connected to each horizontal row group of vertical readout switches VS. The address lines AL transmit address signals from the vertical scan circuit VSC output with a predetermined timing to the vertical readout switch VS so as to control the vertical readout switch VS.

The photoreceptor elements P1–Pn are provided with a plurality of signal lines SL for capturing line the load of the photoreceptor elements P1–Pn to the output OL, and which are connected to the vertical readout switches VS. Horizontal readout switches HS, which are opened and closed by a horizontal scan circuit HSC, are inserted between each signal line SL and output line OL.

A timing generator circuit TC receives a synchronization input signal from the sensor timing control circuit 15, and controls the operations of the vertical scan circuit VSC and the horizontal scan circuit HSC.

That is, control signals from the timing generator circuit TC are transmitted to the vertical scan circuit VSC and the horizontal scan circuit HSC, to selectively control the opening and closing of the vertical readout switch VS and the horizontal readout switch HS. As a result, the load of the photoreceptor elements P1–Pn at each address is discharged through the signal line SL to the output line OL, amplified by an output amplifier AMP connected to the output line OL, and transmitted to the image processing circuit 11.

An exposure pattern generator circuit EXC independently resets the light adjusting control photoreceptor Pm and reads out pixel data during flash photography.

The operation of the present embodiment of the digital camera of the present invention is described hereinafter.

During normal light photography which does not use a flash unit, when the shutter button 9 is depressed half way, the mechanical shutter 6 is first opened. Thereafter, the photoreceptor elements P1–Pn of the image sensor 8 are reset by a signal from the timing generator circuit TC and enter the activated state.

After a predetermined time has elapsed, the vertical readout switch VS and the horizontal readout switch HS are selectively opened/closed, and image signals from the photoreceptor elements P1–Pn are output in the indicated number sequence through the signal line SL to the output line OL. After the image signal is amplified by the output amplifier AMP connected to the output line OL, the image signal is processed in the image processing circuit 11, and displayed on the display unit 10. The luminance is calculated by the image processing circuit 11 based on the obtained image data, and a suitable stop value and exposure time are calculated by the exposure calculator 12 based on the luminance calculation. A live view image is displayed on the display unit 10 as a result of repeating this operation over a predetermined time frame period.

Then, when the shutter button 9 is fully depressed, the stop 5 is controlled based on the exposure control value calculated immediately before by the exposure calculator 12, and the sensor timing control circuit 15 controls the image sensor 8. Consequently, there is a suitable exposure for the image sensor 8.

During photography using normal light, the image data obtained by the light adjusting control photoreceptor element Pm are used as part of the image data similar to the other photoreceptor elements.

Photography using the flash unit 7 is described below.

During flash photography, the amount of load accumulation by the light adjusting control photoreceptor element Pm in the image sensor 8 is detected by the exposure calculator 12, and the amount of accumulation detected by the exposure calculator 12 is monitored to control the flash unit 7.

Figure 4:
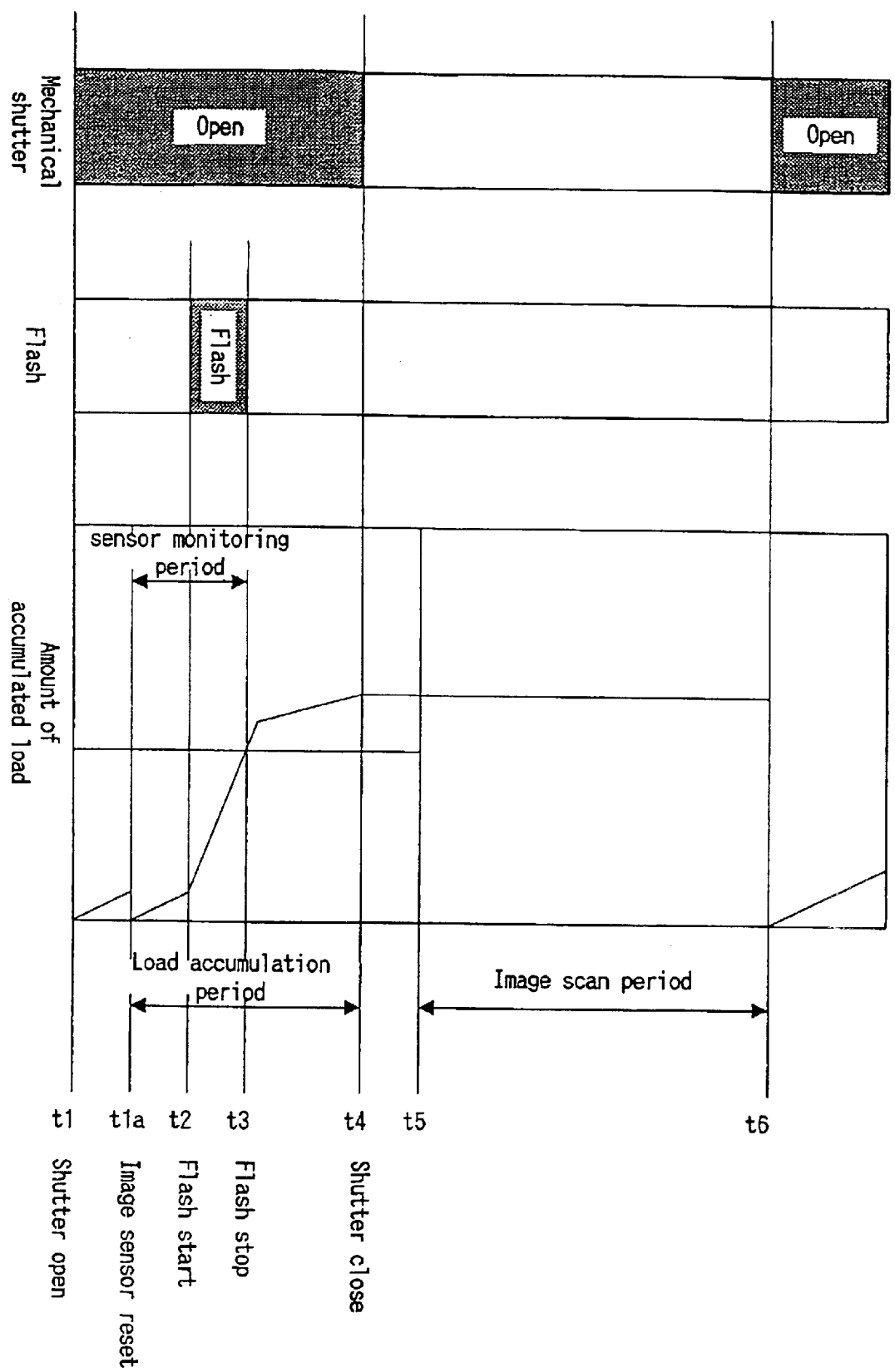
FIG. 4 illustrates the timing of each operation during flash photography in an embodiment of the digital camera of the present invention.
Figure 5:
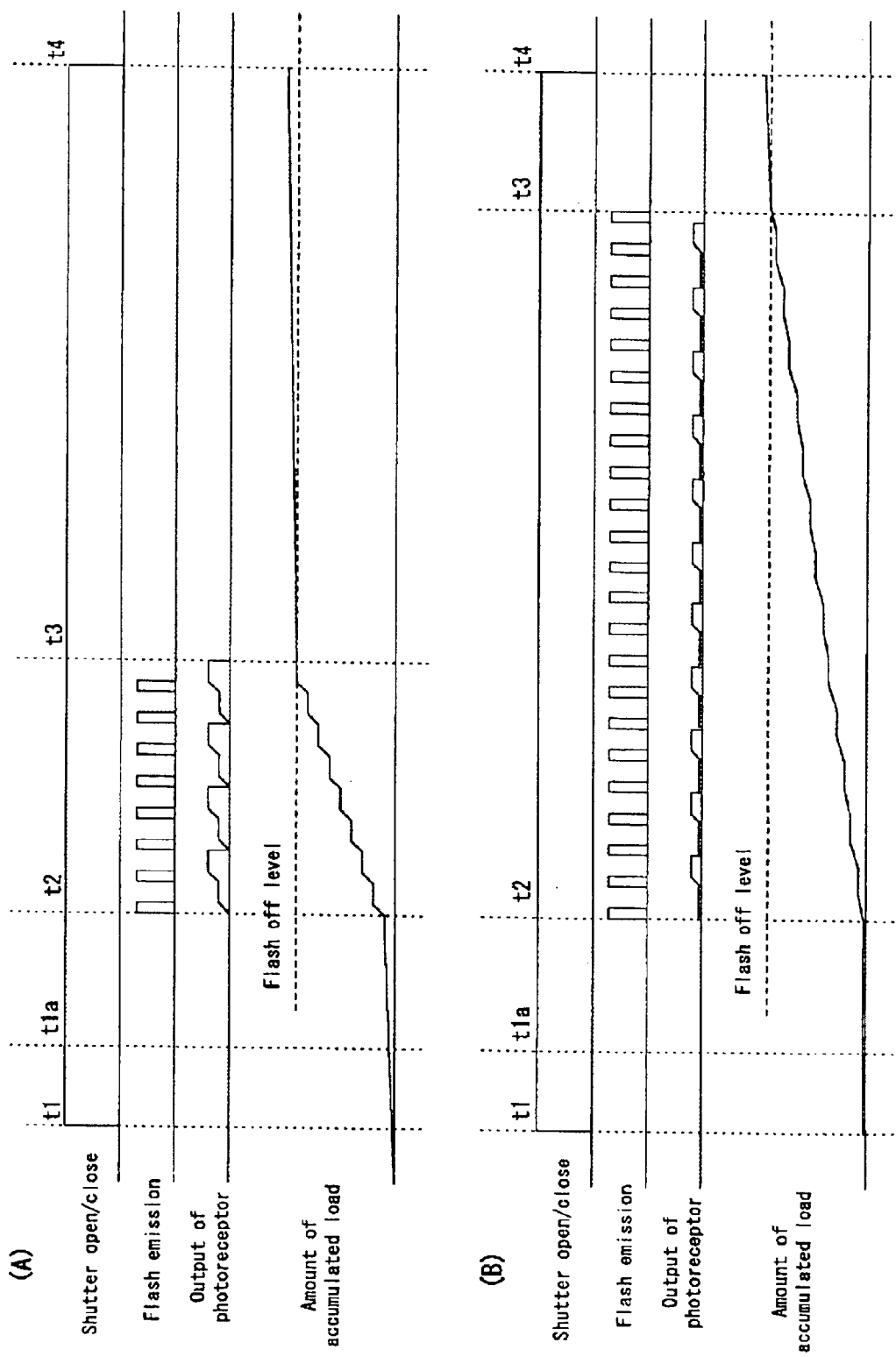
FIGS. 5(A) and 5(B) illustrate the operation timing relating to light adjusting control during flash photography in an embodiment of the digital camera of the present invention.

Specifics of light adjusting control are described below with reference to FIGS. 4 and 5. FIG. 4 illustrates the timing of each operation during flash photography. FIGS. 5(A) and 5(B) illustrate the operation timing related to light adjusting control of the flash unit 7. FIG. 5(A) shows an instance of a photographic object a short distance away, or when the reflectivity from the object is high. FIG. 5(B) shows an instance of a photographic object a long distance away, or when the reflectivity from the object is low. While the example shown in FIGS. 4 and 5 illustrates use with a flash unit that produces multiple light pulses, the light adjusting control method can also be used with a flash unit which produces a single, long pulse by controlling the duration of the single pulse.

The mechanical shutter 6 is opened at time t1, and exposure begins. A reset signal is applied to all photoreceptor elements of the image sensor 8 at time t1a, and actual load accumulation begins.

The flash emission operation by the flash unit 7 begins at time t2, and the flash unit 7 emits a high-speed pulse at predetermined intervals.

With each pulse emission by the flash unit 7, or a percentage of a single cycle of a number of pulse emissions, reset signals are transmitted to the light adjusting control photoreceptor Pm independently from the vertical scan circuit VS via the reset line RLo. The light adjusting control photoreceptor Pm is reset to an initial state each time the aforesaid reset signal is received, and a new load accumulation begins. On the other hand, the amount of accumulated load immediately before the light adjusting control photoreceptor element Pm is reset is read out whenever required and transmitted to the addition circuit 12a of the exposure calculator 12, and cumulatively added by the addition circuit 12a. That is, the light adjusting control photoreceptor element Pm is repeatedly reset during load accumulation for light adjusting control, and each time the load accumulation starts from the initial state. In this way, load accumulation is repeatedly executed and read out in a suitable operation range before a saturation level is attained, to obtain an amount of accumulation of more reliable image data. Of course, the load accumulation may be consecutively executed without resetting.

Since the data cumulatively added by the adding circuit 12a are equal to data obtained by consecutive accumulation operations without saturation, when the cumulatively added value attains a standard flash OFF level, an emission stop signal is output from the exposure calculator 12a at time t3 to stop emission operation of the flash unit 7. As shown in FIG. 5(A), when the photographic object is a short distance away, or when the reflectivity from the object is high, the added value of the data from the light adjusting control photoreceptor elements Pm attains the flash OFF level in a short time. On the other hand, as shown in FIG. 5(B), when a photographic object is a long distance away, or when the reflectivity from the object is low, a long time is required until the flash OFF level is reached, and during this time the high-speed pulse flash is operated continuously.

Flash light adjusting control can be performed simultaneously with photography.

When a plurality of individual light adjusting control photoreceptor elements Pm are provided, for example, the cumulatively added values obtained by the respective light adjusting control photoreceptor elements may be averaged, and a determination made as to whether or not the average value has attained the flash OFF level.

Thereafter, the mechanical shutter 6 is closed at time t4, and this ends the actual exposure. The actual load accumulation time extends from time t1a to time t4. Thereafter, the accumulated load of each pixel other than the light adjusting control photoreceptor elements Pm are read out, and flash photography ends.

As described above, the image data from the light adjusting control photoreceptor element Pm during flash photography are used for light adjusting control and are not used as photographic image data. For this reason, during flash photography, photographic data relating to the light adjusting control photoreceptor element Pm are omitted. Interpolation of the omitted pixels is performed as shown in FIGS. 6(A)–6(C). FIG. 6(B) shows an interpolation filter when a G (green) pixel is used as the light adjusting control photoreceptor element Pm in the layout pattern of pixels (filter) P of the image sensor 8 shown in FIG. 6(A). On the other hand, FIG. 6(C) shows an interpolation filter when an R (red) or B (blue) pixel is used as the light adjusting control photoreceptor element Pm. In either case, adjacent pixels of identical color are used, and their values averaged for interpolation.

Figure 7:
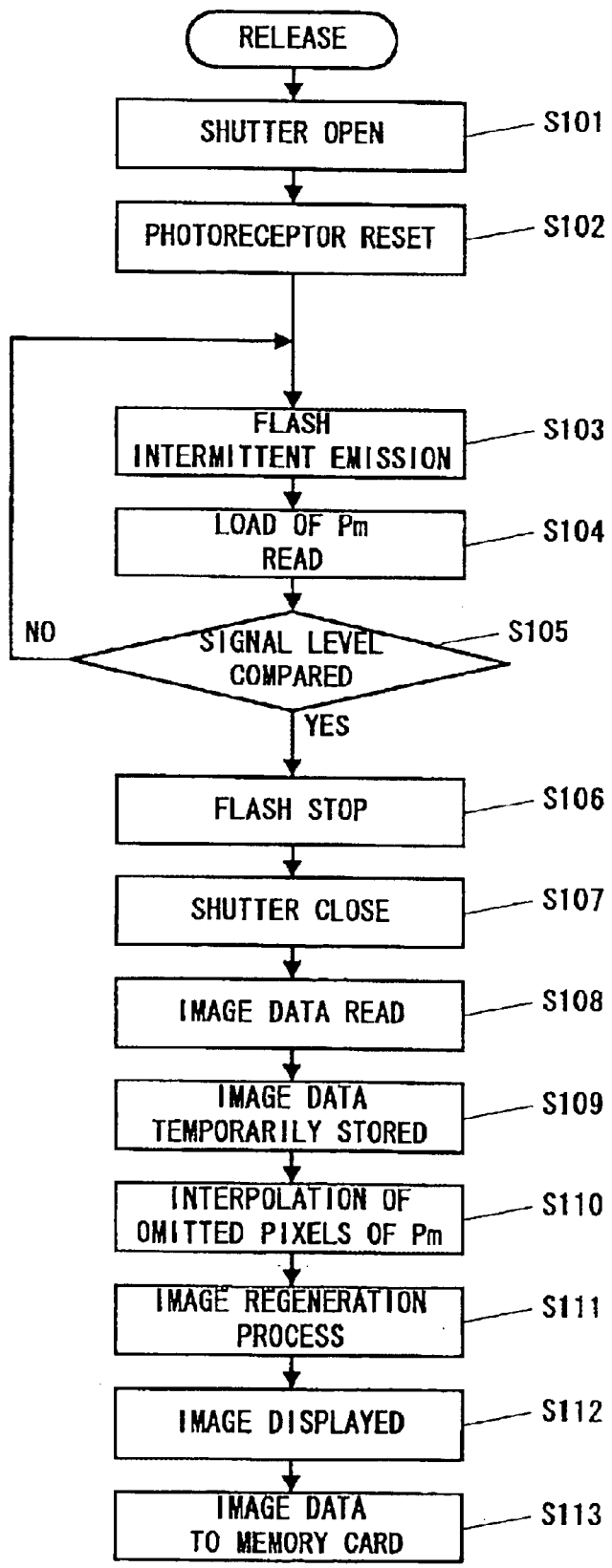
FIG. 7 is a flow chart showing the light adjusting control sequence during flash photography in an embodiment of the digital camera of the present invention.

FIG. 7 is a flow chart showing the light adjusting control sequence during flash photography. In the drawing and throughout the following description, the term "step" is abbreviated to "S."

In the case of the conventional light adjusting control method using a preliminary flash, the preliminary flash is emitted simultaneously when the mechanical shutter opens, and the image data are read once. The flash emission time is calculated based on the read image data. Thereafter, the main flash light is emitted, and the image data are subjected to image processing after the mechanical shutter is closed.

In contrast, in the light adjusting control method of the present embodiment, after the mechanical shutter 6 is opened in S101 via a release operation each photoreceptor element of image sensor 8 including the light adjusting control photoreceptor element Pm is reset in S102, and load accumulation begins.

Then, the flash unit 7 starts high-speed intermittent emission in S103. During this time, in S104, the load of the light adjusting control photoreceptor element Pm is read each time synchronously with the emission operation, and the data are added by the addition circuit 12a. In S105, a determination is made as to whether or not the added cumulative value has attained a predetermined signal level. When the predetermined level has been reached (S105: YES), in S106 the emission from flash unit 7 is stopped. When the predetermined level has not been reached (S105: NO), the routine returns to S103, and flash emission continues.

After the emission operation of flash unit 7 is stopped, the mechanical shutter 6 is closed in S107. Then, in S108, the process of reading the loads of the photoreceptor element excepting the light adjusting control photoreceptor element Pm is performed, and in S109, the image data corresponding to the read load are temporarily stored in memory.

Thereafter, in S110, an interpolation process is performed relative to the omitted pixels of the light adjusting control photoreceptor element Pm, and an image regeneration process is executed in S111. In S112, the image is displayed on the display unit 10, and in S113, the image data are written to a memory card.

Alternatively, as the loads of the light adjusting control photoreceptor element Pm are cumulatively added, the cumulatively added loads may be used without requiring interpolation of adjacent identical color photographic data for replacement of the photoreceptor element Pm photographic data. As a further alternative, both the cumulatively added load data and the interpolated adjacent identical color photographic data may be compared. In this case, the cumulatively added load data and the interpolated adjacent identical color photographic data may be averaged, or the larger or smaller of the data may be used as required.

Figure 8:
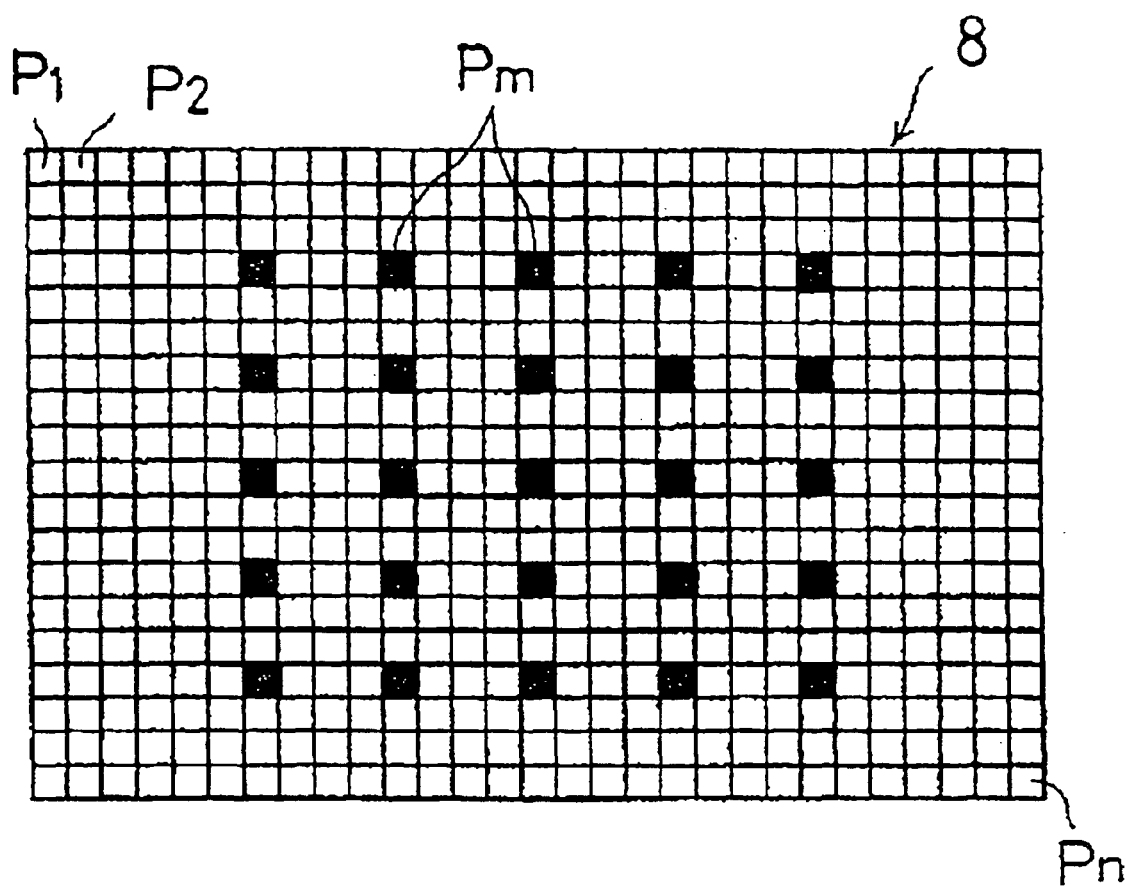
FIG. 8 is a diagram showing another example of an arrangement pattern of the photoreceptor elements used for light adjusting control in an image sensor.

The distribution of light adjusting control photoreceptor elements Pm in the image sensor 8 is optional, and an example of a layout having a vertical and horizontal distribution in the center of the photoreceptor surface is shown in FIG. 8.

In the present embodiment, the light adjusting control photoreceptor element Pm is specified beforehand. However, the present invention is not limited to this arrangement, and a special reset line RLo may be connected to all photoreceptor elements P or photoreceptor elements P in a predetermined region beforehand, such that an optimal photoreceptor element may be set as the light adjusting control photoreceptor element Pm according to photographic conditions.

Although the flash unit is constructed as being detachable from the camera body 2 in the previously described embodiment, it is to be noted that the flash unit also may be built into the camera body.

The present invention as described above uses a specific photoreceptor element of the image sensor as a light adjusting control photoreceptor element, and uses the data from this photoreceptor element for light adjusting control. Accordingly, there is no dislocation of the luminance range due to change in the field angle as occurs in external light adjusting control methods, and highly reliable light adjusting control can be accomplished in real time.

Furthermore, when a CMOS sensor is used as the image sensor, the amount of load accumulation of the light adjusting control photoreceptor element can be reliably detected, providing light adjusting control of even greater reliability.

The present invention repeatedly resets the light adjusting control photoreceptor element, reads the data therefrom, and cumulatively adds the data obtained by the respective readings. As a result, the operating range used is suitable for the operating characteristics of the light adjusting control photoreceptor element and avoids the saturation range of the light adjusting control photoreceptor element, whereby reliable load accumulation is obtained, and even higher precision light adjusting control is possible.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A digital camera capable of flash photography by illuminating a photographic object, the digital camera comprising:
an image sensor for sensing an image of the photographic object, the image sensor including a plurality of photoreceptor elements, the image sensor being adapted for reading an electrical load accumulation of each of at least one predetermined photoreceptor element among the plurality of photoreceptor elements;
a detector for detecting an amount of the electrical load accumulation of each of the at least one predetermined photoreceptor element due to light exposure on the at least one predetermined photoreceptor element during a flash exposure for a duration of the flash exposure, and for outputting a corresponding detection signal;
an interpolator for interpolating photographic data of photoreceptor elements, the photoreceptor elements of identical color and adjacent to each of the at least one predetermined photoreceptor element, the interpolator thus generating respective interpolated photographic data for each of the at least one predetermined photoreceptor element; and
a controller for accomplishing light adjusting control of the flash exposure based on the thus outputted detection signal.

2. A digital camera in accordance with claim 1, wherein the at least one predetermined photoreceptor element is adapted for being reset to start a new electrical load accumulation from an initial state.

3. A digital camera in accordance with claim 2, wherein the detector can detect the amount of the electrical load accumulation of each of the at least one predetermined photoreceptor element by repeatedly resetting each of the at least one predetermined photoreceptor element during load accumulation, reading the electrical load accumulation prior to each resetting, and performing cumulative addition of the electrical load accumulation obtained by each reading.

4. A digital camera in accordance with claim 1, wherein the flash exposure is a plurality of high-speed light pulses at predetermined intervals.

5. A digital camera in accordance with claim 4, wherein the controller accomplishes light adjusting control of the flash exposure by controlling a number of the plurality of high-speed light pulses.

6. A digital camera in accordance with claim 1, wherein the outputted detection signal corresponds to an average of the amount of the electrical load accumulation of each of the at least one predetermined photoreceptor element.

7. A digital camera in accordance with claim 6, wherein the average of the amount of the electrical load accumulation of each of the at least one predetermined photoreceptor element is a weighted average.

8. A digital camera in accordance with claim 1, further comprising:
a data replacement unit for replacing the electrical load accumulation of each of the at least one predetermined photoreceptor element with corresponding replacement data.

9. A digital camera in accordance with claim 8, wherein the replacement data is respective interpolated photographic data.

10. A digital camera in accordance with claim 8, wherein the replacement data is an average of respective interpolated photographic data and electrical load accumulation.

11. A digital camera in accordance with claim 10, wherein the average of respective interpolated photographic data and electrical load accumulation is a weighted average.

12. A digital camera in accordance with claim 8, wherein the replacement data is a predetermined one of respective interpolated photographic data and electrical load accumulation.

13. A digital camera in accordance with claim 1, wherein a location of each of the at least one predetermined photoreceptor element is adjusted according to photographic conditions.

14. A digital camera capable of flash photography by illuminating a photographic object, the digital camera comprising:
a flash unit for producing a flash exposure including at least one light pulse;
an image sensor for sensing an image of the photographic object, the image sensor including a plurality of photoreceptor elements, the image sensor being adapted for reading an electrical load accumulation of each of at least one predetermined photoreceptor element among the plurality of photoreceptor elements;
a detector for detecting an amount of the electrical load accumulation of each of the at least one predetermined photoreceptor element due to light exposure on each of the at least one predetermined photoreceptor element during a flash exposure for a duration of the flash exposure, and for outputting a corresponding detection signal;
an interpolator for interpolating photographic data of photoreceptor elements, the photoreceptor elements of identical color and adjacent to each of the at least one predetermined photoreceptor element, the interpolator thus generating respective interpolated photographic data for each of the at least one predetermined photoreceptor element; and
a controller for accomplishing light adjusting control of the flash exposure based on the thus outputted detection signal, the controller controlling a duration of the flash exposure.

15. A digital camera in accordance with claim 14,
wherein each of the at least one predetermined photoreceptor element is adapted for being reset to start a new electrical load accumulation from an initial state, and
wherein the detector can detect the amount of the electrical load accumulation of each of the at least one predetermined photoreceptor element by repeatedly resetting each of the at least one predetermined photoreceptor element during load accumulation, reading the electrical load accumulation prior to each resetting, and performing cumulative addition of the electrical load accumulation obtained by each reading.

16. A digital camera in accordance with claim 14, further comprising:
a data replacement unit for replacing the electrical load accumulation of each of the at least one predetermined photoreceptor element with respective interpolated photographic data.

17. A digital camera in accordance with claim 14, wherein a location of each of the at least one predetermined photoreceptor element is adjusted according to photographic conditions.

18. A method for light adjusting control of a digital camera capable of flash photography by illuminating a photographic object, the digital camera including an image sensor with a plurality of photoreceptor elements for sensing an image of the photographic object, the method comprising the steps of:
accumulating an electrical load due to light exposure of each of at least one predetermined photoreceptor element among the plurality of photoreceptor elements when using a flash exposure;

detecting an amount of the thus accumulated electrical load of each of the at least one predetermined photoreceptor;

outputting a detection signal corresponding to the thus detected amount of accumulated electrical load during the flash exposure for a duration of the flash exposure; and interpolating photographic data of photoreceptor elements of identical color and adjacent to each of the at least one predetermined photoreceptor element, the interpolating thus generating respective interpolated photographic data for each of the at least one predetermined photoreceptor element; and accomplishing light adjusting control of the flash exposure based on the thus outputted detection signal.

19. A method for light adjusting control of a digital camera capable of flash photography in accordance with claim 18, wherein the at least one predetermined photoreceptor element is adapted for being reset to start a new electrical load accumulation from an initial state, and wherein the step of detecting an amount of the thus accumulated electrical load includes:

repeatedly resetting each of the at least one predetermined photoreceptor element during the accumulating of an electrical load step;

reading the accumulated electrical load prior to each resetting; and performing cumulative addition of the accumulated electrical load obtained by each reading.

20. A method for light adjusting control of a digital camera capable of flash photography in accordance with claim 18, the flash exposure being a plurality of high-speed light pulses at predetermined intervals, wherein the step of accomplishing light adjusting control includes controlling a number of the plurality of high-speed light pulses.

* * * * *

UNITED STATES PATENT AND TRADEMARK OFFICE
CERTIFICATE OF CORRECTION

PATENT NO. : 6,961,091 B1
DATED : November 1, 2005
INVENTOR(S) : Hiroaki Kubo

It is certified that error appears in the above-identified patent and that said Letters Patent is hereby corrected as shown below:

Column 5,
Line 8, delete "ent" and insert -- element --.
Line 19, delete "capturing line the" and insert -- capturing the --.

Signed and Sealed this

Twenty-seventh Day of December, 2005

JON W. DUDAS
*Director of the United States Patent and Trademark Office*